April 2, 1957 K. M. BARTLETT 2,787,441
HOLLOW TURBINE BUCKET
Filed March 5, 1952
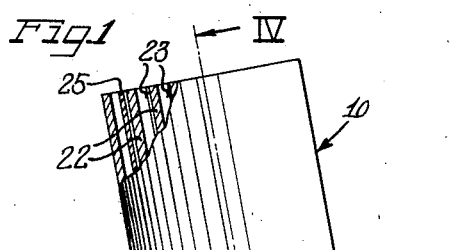
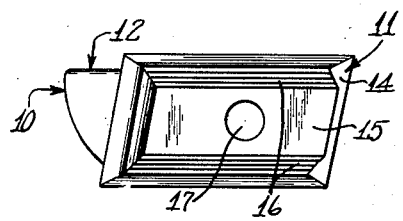
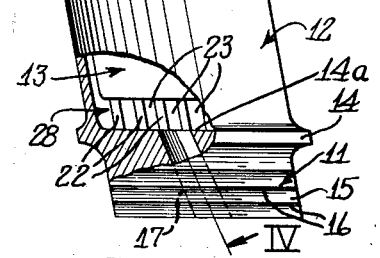
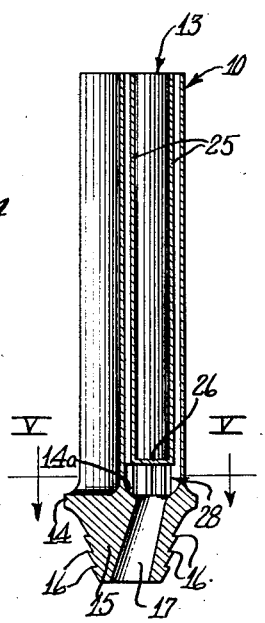
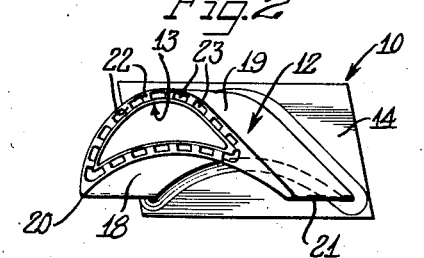
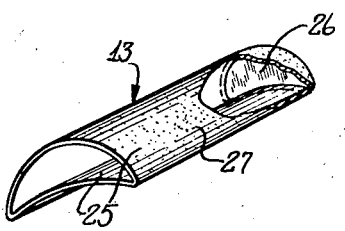
Inventor:
Kenneth M. Bartlett
by [signature] Attys United States Patent Office 2,787,441
Patented Apr. 2, 1957

2,787,441

HOLLOW TURBINE BUCKET

Kenneth M. Bartlett, South Euclid, Ohio, assignor to Thompson Products, Inc., Cleveland, Ohio, a corporation of Ohio Application March 5, 1952, Serial No. 274,937

1 Claim. (Cl. 253—39.15)

This invention relates to passaged turbine buckets and blades especially suitable for gas turbine engines. Specifically, the invention relates to turbine buckets and blades which have hollow internally ribbed vane or foil portions containing an insert thimble anchored to the ribs and cooperating therewith to define a plurality of air passages closely adjacent the vane or foil surface.

The invention will be hereinafter described as embodied in a turbine bucket for a turbo-jet engine, but the term "bucket" is used throughout the specification and claim to include blades for the axial flow compressors of turbo-jet engines as well as buckets for the compressor driving turbine assembly in a turbo-jet engine. It will be further understood that the "buckets" of this invention have general application as stationary or rotating fluid flow directing members and the invention is therefore not limited to any specific or preferred usage.

According to this invention, a metal turbine bucket is cast with a hollow foil or vane portion and an integral butt or root section. The vane portion has spaced internal parallel ribs extending longitudinally from the root end to the tip end thereof. These ribs are integral with the vane surface defining walls and project inwardly into the hollow interior of the vane to provide inner faces following the contour of the inner faces of the vane walls. A central bore is provided in the root portion to register with the hollow interior of the vane portion. This bore can be cast in the root, or can be drilled into the root. A thin sheet metal thimble, closed at one end, is inserted into the hollow vane portion with the closed end spaced from the root and with the open end terminating flush with the end of the vane. This thimble is shaped into conformity with the vane interior to have the side walls thereof snugly engage the inner faces of the ribs. The thimble and ribs are then integrally united by brazing or the like. Prior to inserting the thimble in the vane, both the thimble and the vane parts are preferably coated with a brazing alloy. The alloy can be applied by spraying powdered brazing metal onto the parts to form a coating. When the assembled coated parts are heated in a non-oxidizing atmosphere to brazing temperatures, the parts are integrally united through a bond on each rib. Beneath the closed end of the thimble in the vane, there is provided a chamber registering with the bore in the root so that air or other cooling fluid from this bore will be distributed to channels between the ribs and flow through these channels to the tip end of the vane. Since the channels are located closely adjacent the vane or foil surface, an efficient cooling of this surface is obtained. The air or other cooling fluid can be fed to the root of the vane from the rotor wheel or from the ring mounting for stationary blades.

It is, then, an object of this invention to provide a fluid cooled bucket for gas turbine engines and the like which has a plurality of longitudinal cooling passages closely adjacent the surface of the vane or foil section thereof.

Another object of this invention is to provide a gas turbine bucket with a hollow vane portion having air passages around the hollow interior thereof closely adjacent the vane walls to efficiently cool the working faces of the vane.

Another object of this invention is to provide a turbine bucket with a hollow vane portion carrying a hollow thimble which contacts therewith to define a plurality of longitudinal cooling passages around the interior thereof close to the working face thereof.

A still further object of this invention is to provide a turbine bucket with a hollow vane having alternate internal ribs and passages extending longitudinally around the interior thereof and receiving a thimble shaped to the contour of the vane to provide an inner wall for the passages and a bottom wall overlying the root portion of the bucket to distribute cooling fluid from a passage in the root to each of the longitudinal passages between the ribs.

A still further object of this invention is to provide a turbine bucket with a hollow vane section carrying a hollow thimble in integral bonded relation to coact therewith for defining air passages therethrough.

Other and further objects of this invention will be apparent to those skilled in the art from the following detailed description of the annexed sheet of drawings which, by way of a preferred embodiment only, illustrates one example of this invention.

On the drawings:

Figure 1 is a side elevational view, with parts broken away and shown in longitudinal cross section, of a turbine bucket according to this invention.

Figure 2 is a tip end view of the bucket of Figure 1.

Figure 3 is a root end view of the bucket of Figure 1.

Figure 4 is a longitudinal cross-sectional view taken along the line IV—IV of Figure 1.

Figure 5 is a transverse cross-sectional view taken along the line V—V of Figure 4.

Figure 6 is an isometric view of the insert thimble for the bucket with a part broken away to show the closed end wall.

As shown on the drawings:

The turbine bucket 10 of this invention includes a casting or body member having a solid anchoring root portion 11 and a hollow vane or air foil portion 12 extending from the root and carrying a hollow sheet metal thimble 13 therein.

The anchoring root 11 has a generally rectangular top 14 and a tapered base 15 depending therefrom. The base 15 has opposed side faces having transversely extending teeth 16 in spaced parallel relation. These teeth form anchoring ledges to mount the blade in position in a rotor or stator (not shown). A bore or passageway 17 extends through the base 15 and through the top face 14a thereof lying in the plane of the top 14 of the root 11 to register with the hollow interior of the vane 12.

The vane 12 has a concave front working face 18 and a convex back face 19 with a narrow leading edge 20 and a tapered trailing edge 21. The vane is shaped to form a desired air foil section for the purpose intended. The vane is hollow from the top face of the root top 14 through the open end thereof. The hollow interior of the vane has spaced parallel longitudinal ribs 22 extending from the top 14 of the root to the open end of the vane. These ribs provide grooves therebetween and each rib has an inner face spaced inwardly a uniform distance from the faces 18 and 19 of the vane. As shown in Figure 5, these inner faces 24 follow the contour of the outer faces 18 and 19. As also shown in Figure 5, both the leading end 20 and the trailing end 21 of the vane are solid.

The sheet metal thimble 13 has side walls 25 contoured to fit against the inner faces 24 of the ribs 22 and a flat bottom wall 26 for lying above the top face 14a of the root portion 14 in substantially parallel relation therewith and forming with said top face a chamber 28 of substantial radial height. The thimble 13 is composed of relatively thin sheet metal and can be deep drawn or fabricated from a flat sheet with the bottom 26 welded or brazed into place.

Prior to insertion in the foil 12, the thimble 13 has the faces 25 thereof coated with a brazing material 27 as indicated in Figure 6. The brazing material can be any suitable brazing metal and, for high temperature operation, preferably contains nickel and chromium. A suitable brazing composition is:

| Metal: | Percent by weight |
|---|---|
| Cr | 15.0 |
| B | 4.5 |
| Si | 4.54 |
| Fe | 5.0 |
| C | 0.70 |
| Mn | 0.01 |
| Ni | Balance |

The coating 27 is conveniently applied by admixing the brazing metal powder with a suitable vehicle and spraying the powder onto the thimble to form the coating. The interior of the foil 12 is similarly coated so that the faces 24 of the ribs 22 will have brazing alloy coated thereon.

The thimble is inserted into the hollow interior of the foil 12 in firm contact throughout its full length with each of the inner faces 24 of the ribs and the outer edge of the thimble is positioned flush with the outer end of the foil, while the end wall 26 of the thimble will be spaced above the wall 14 of the root. The faces 25 of the thimble coact with the grooves defined by ribs 22 of the vane to form elongated parallel rectangular passages or passageways 23. After assembly, the parts are heated in a non-oxidizing atmosphere to effect the brazing operation. When the brazing has been completed, each passage 23 will have an inner face or wall extending from the bottom 26 of the thimble to the open end of the foil.

As best shown in Figures 1 and 4, the bore 17 of the root registers with a chamber 28 in the vane interior under the thimble wall 27. The passages 23 between the ribs 22 extend beneath this wall 26 of the thimble and each of the passages 23 is therefore in full registry with the chamber 28. Air or other cooling fluid from the bore 17 is thereby distributed by the chamber 28 into each of the passages 23 to flow therethrough and out of the open tip end of the bucket. The passages 23 are located closely adjacent the faces 18 and 19 of the bucket and are in good heat exchange relation with these faces. The integral ribs 22 afford additional cooling areas for the faces and a very high heat transfer relationship is created. Since the thimble is hollow, it does not add appreciable weight to the bucket, but it does reinforce the vane section, since it cooperates with the inner ends of the struts or ribs to tie the same together along an integral inner wall.

From the above descriptions it will therefore be understood that this invention provides a turbine bucket composed of a hollow casting which is formed of any desired temperature-resisting metal. If desired, the bucket body could be formed by forging or machining, or in any desirable manner. The bucket of this invention includes a hollow thimble conveniently composed of thin sheet metal. In the preferred embodiment, the hollow vane portion of the bucket has integral longitudinally extending ribs. These ribs need only be about .05 inch in depth, and about .03 inch in width. They may be spaced to provide passages of about .08 inch in width.

I claim as my invention:

A fluid-cooled hollow turbine bucket which comprises a metal body member having an anchoring root portion, said root portion having an inner top face, a hollow vane portion extending integrally from the top of said root portion about said inner face with the free end thereof open, said vane portion having solid leading and trailing edge portions and front and back external working faces extending continuously therebetween, the inner surfaces of said vane portion having ribs providing grooves therebetween extending continuously from the inner top face of said root portion to said open end, said ribs being of uniform height to provide inner faces spaced uniformly from said working faces, and a thin-walled metal thimble having an open end registering with the open free end of said vane portion and a closed bottom wall, said thimble having outer surfaces conforming to and in firm contact with each of said rib inner faces and bonded thereto throughout the full length of said thimble outer surfaces to define with said grooves a corresponding number of separate passages open at said free open end of said vane portion, said root portion having a fluid passage extending axially through said root portion and the inner face thereof, the bottom wall of said thimble being radially spaced a substantial distance from said root portion inner face to provide a chamber from which a cooling fluid introduced thereinto through said fluid passage in said root portion is distributed to said separate passages for flow through each thereof and out of the open end of said vane portion.

References Cited in the file of this patent

FOREIGN PATENTS

| 584,580 | Great Britain | Jan. 17, 1947 |
| 602,530 | Great Britain | May 28, 1948 |
| 619,107 | Great Britain | Mar. 3, 1949 |
| 625,693 | Great Britain | July 1, 1949 |